Sept. 30, 1941. C. A. TAYLOR 2,257,202
COMBINATION FRUIT CORER AND GOUGE
Filed Dec. 13, 1938
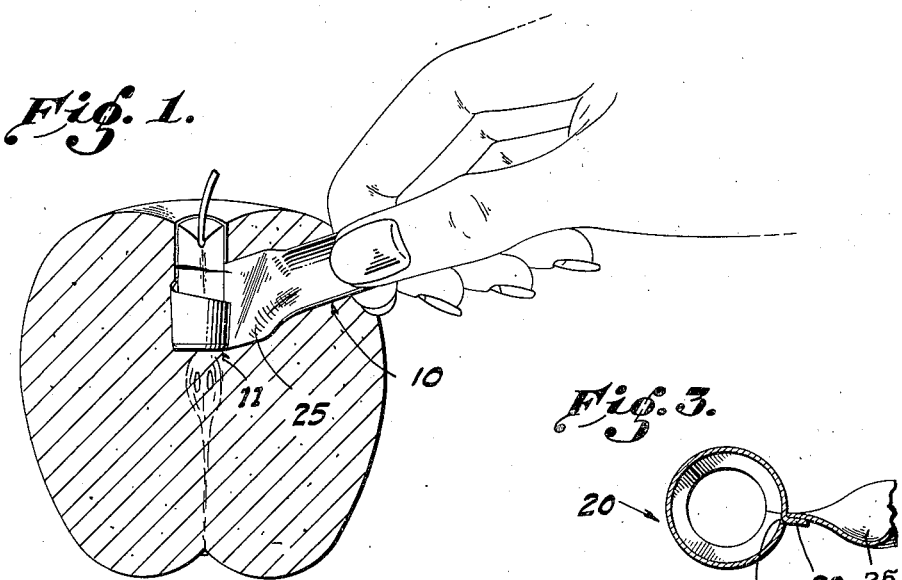
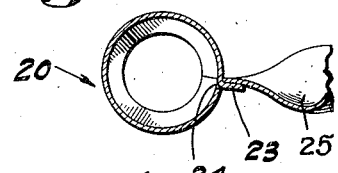
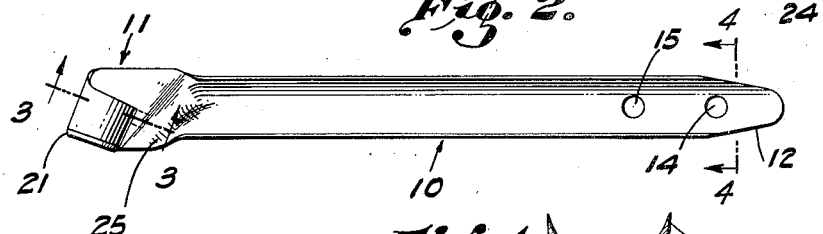
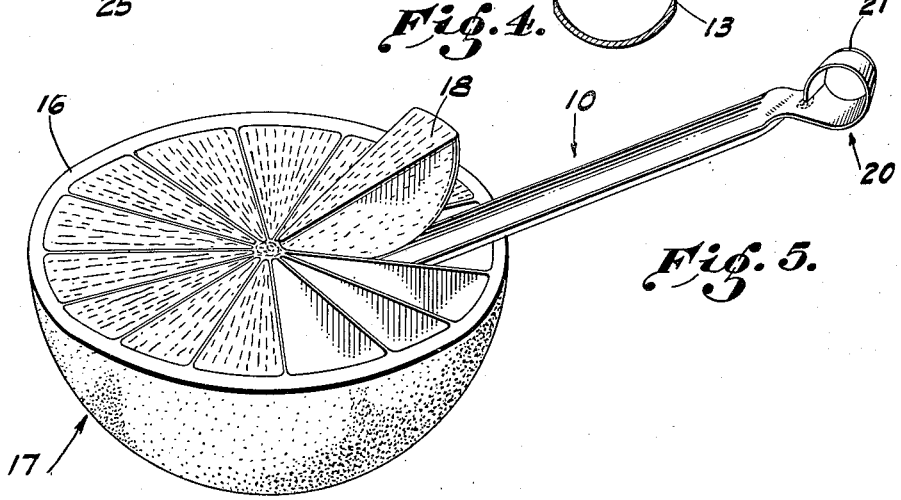
CHESTER A. TAYLOR,
INVENTOR.
BY
ATTORNEY.

Patented Sept. 30, 1941

2,257,202

UNITED STATES PATENT OFFICE 2,257,202

COMBINATION FRUIT CORER AND GOUGE

Chester A. Taylor, Los Angeles, Calif.

Application December 13, 1938, Serial No. 245,411

2 Claims. (Cl. 30—316)

This invention relates to a utensil for removing parts of fruit, whether the parts removed are to be discarded, as in coring operations or to be retained, as in case the article is used to remove the pulpy portion of a citrus fruit, to be used in making salads, or in some other manner.

One object of the invention is to provide an implement of the kind stated with an improved kind of sheet-metal handle which will be particularly well adapted to be joined to and in use cooperate with, the cutting portions of the implement.

Another object of the invention is to provide an improved spoon-like part for digging or spooning out the pulp of a citrus fruit between the septums thereof and for gouging out fruit cores.

Still another object is to provide a tool or implement of the kind stated with an improved frusto-conically shaped blade to perform coring-out operations.

It is also an object of the invention to provide a fruit coring implement which may be used to remove cores with a minimum amount of wasting of the edible portion of the fruit.

Other objects, advantages, and features of invention will hereinafter appear.

Referring to the accompanying drawing, which illustrates what is at present deemed to be a preferred embodiment of the invention, Fig. 1 is a side elevation of the article, showing it in use during a coring operation.

Fig. 2 is an inner face view thereof.

Fig. 3 is a cross-section on line 3—3 of Fig. 2.

Fig. 4 is a section on line 4—4 of Fig. 2 showing, in a conventional manner, the end portion only of the coring part of the implement, illustrating the taper of its cutting edge.

Fig. 5 is a perspective view illustrating the article in use to remove pulp from a citrus fruit.

Referring in detail to the drawing, the implement is shown as consisting of a single strip of sheet metal, preferably stainless steel, having a shank or body portion 10 which is arcuate in cross section. One end portion 11 of said strip is tapered to a rounded extremity, and both the rounded and tapered part is furnished at each side with a knife edge 12, the bevel 13 of which is located only at the convex side of the utensil. Drainage openings 14 and 15 are shown near this end of the article, located at its mid-width, these openings permitting the juice of the fruit to flow back into the space enclosed by the rind 16 of the citrus fruit 17 when the implement is used, as shown in Fig. 5, to spoon out a pulp segment 18 thereof.

At the opposite end of the implement, the metal is shaped and bent into a frusto-conical coring member 20, which is furnished with a cutting edge 21 around its smaller end. The outer end of the curled part 20 is furnished, adjacent to the wide side of the coring part, with an ear 23 which is directed through a small slot 24 and is then bent back so as to form a means for keeping the curled coring part 20 in a fixedly curled condition, this being obviously only one of a number of ways whereby the ear may be held in place.

The coring portion of the implement is shaped in such a manner as to provide a valley 25 at the juncture of the curled part 20 with the concave shank 10, said valley communicating with the channel along said shank resulting from its concave character. Hence, fruit juice running along the shank may escape through said valley.

The axis of the frusto-conical coring part of the implement is not shown at a right angle to the shank 10 but is inclined in such a manner that, when said shank is held in the hand at a natural inclination, as shown in Fig. 1, the axis of the coring part will extend vertically. This makes it more convenient for the operator to use the implement in an easy, advantageous manner. The operator's thumb being seated in the concavity of the arcuate shank enables him to obtain a firmer hold upon the implement. This arcuate form of the shank adds greatly to the strength of the sheet-metal strip of which it is made, and it also, in conjunction with the aforesaid valley 25, provides a drainage channel for any fruit juices which may not pass through the openings 14 and 15, preventing such juices from running onto the user's hand.

In the operation of the implement, after the apple, pear, or other fruit to be cored has been split into halves, one half thereof, while supported or steadied in the position shown in Fig. 1, is operated upon by the corer as illustrated in said view. After the corer has been thus advanced to the position shown, then it may be withdrawn and the fruit inverted, whereupon a reverse cutting operation is performed thereon. Then, the opposite end portion of the implement may be utilized to remove the core together with the semi-circularly cut stem and blossom portions. Thus the operator may remove from each half of the fruit the entire nonedible portions thereof. In using the frusto-conical coring part 20, it is only necessary to make shallow segmental cuts in the stem and blossom parts of the fruit, the deeper cut necessary to remove the core proper being thereafter performed by the gouge portion 12. Thus, a good coring operation is performed with a minimum waste of edible fruit.

In performing the foregoing coring operation, the axis of the curled portion 11 of the implement will be maintained in an approximately vertically extending position owing to it being angularly related to the body portion of the implement, and as a result the handle will be positioned at an upward inclination, thereby causing any juice which may flow from the fruit to be kept out of contact with the hand of the operator.

Owing to the frusto-conical shape of the corer, by inverting the implement after a coring operation thus directing the wider end of the coring passage downwardly and then giving a downward impact to the article, the contained portion of the fruit may readily be disengaged from the implement.

The curled, coring end of the implement may be used for slicing bananas, peaches, and other fruits. When so used in cutting bananas, the slices or cuts made do not adhere to each other, because, owing to the cylindrical, or partly cylindrical, shape of the slices in cross section, flat faces do not result, and hence cannot overlie each other in an adherent manner. This is also true of pears and of other fruits having a similarity to bananas as to the more or less sticky nature of their edible portions.

It should be understood that the present disclosure is for the purpose of illustration only and that this invention includes all modifications and equivalents which fall within the scope of the subject matter claimed.

I claim:

1. An implement of the kind decribed, including a strip of sheet metal having a body portion which forms a handle, one end portion of said strip being frusto-conically curled, thereby forming a coring element, the axis of said curled part being inclined in relation to the direction in which the body portion of said strip extends, the large end of said frusto-conically curled part being located at the juncture of said curled part with said body portion of the implement and the small end thereof having a cutting edge.

2. An implement of the kind described, including a strip of sheet metal, one end portion of said strip being frusto-conically curled, thereby forming a coring element, there being a depression formed outside of said curled part at its juncture with the body portion of the implement, said curled part having at its extremity an ear which extends through a slot located at the bottom of said depression, the part of said ear which projects through said slot being bent down within said depression to maintain said part in its curled condition.

CHESTER A. TAYLOR.